US009825907B2

(12) United States Patent
Bienert et al.

(10) Patent No.: US 9,825,907 B2
(45) Date of Patent: Nov. 21, 2017

(54) TRANSFER OF A DOMAIN NAME THROUGH MOBILE DEVICES

(71) Applicant: Go Daddy Operating Company, LLC, Scottsdale, AZ (US)

(72) Inventors: Philip Bienert, Paradise Valley, AZ (US); Chris Blanton, Phoenix, AZ (US)

(73) Assignee: GO DADDY OPERATING COMPANY, LLC, Scottsdale, AZ (US)

( * ) Notice: Subject to any disclaimer, the term of this patent is extended or adjusted under 35 U.S.C. 154(b) by 0 days.

(21) Appl. No.: 15/297,022

(22) Filed: Oct. 18, 2016

(65) Prior Publication Data
US 2017/0048193 A1 Feb. 16, 2017

Related U.S. Application Data

(62) Division of application No. 14/266,734, filed on Apr. 30, 2014, now Pat. No. 9,503,306.

(51) Int. Cl.
| | |
|---|---|
| *H04L 29/12* | (2006.01) |
| *H04L 29/06* | (2006.01) |
| *H04L 29/08* | (2006.01) |
| *G06Q 10/00* | (2012.01) |

(52) U.S. Cl.
CPC ......... *H04L 61/3025* (2013.01); *G06Q 10/00* (2013.01); *H04L 29/06* (2013.01); *H04L 29/08* (2013.01); *H04L 61/302* (2013.01); *H04L 67/02* (2013.01); *H04L 67/18* (2013.01); *H04L 67/20* (2013.01); *H04L 67/42* (2013.01)

(58) Field of Classification Search
CPC ......... H04L 67/20; H04L 67/02; H04L 67/18; H04L 29/06; H04L 61/3025; H04L 67/42; H04L 61/302; H04L 29/08; G06Q 10/00
See application file for complete search history.

(56) References Cited

U.S. PATENT DOCUMENTS

| | | | |
|---|---|---|---|
| 2006/0129629 A1* | 6/2006 | Kawashima | G06Q 10/107 709/203 |
| 2014/0325089 A1* | 10/2014 | Lin | H04L 63/10 709/245 |

* cited by examiner

*Primary Examiner* — Kim T Nguyen
(74) *Attorney, Agent, or Firm* — Quarles & Brady LLP

(57) ABSTRACT

A domain name may be transferred from a donor account to a recipient account at a registrar using a donor mobile device and a recipient mobile device that may be in close proximity to each other. An application on the donor mobile device may send a donor request to an application on the recipient mobile device identifying the domain name. The application on the recipient mobile device may send either an accept or a reject of the donor request to the application on the donor mobile device. If accepted by the application on the recipient mobile device, the application on the donor mobile device may send a request to the registrar to move the domain name from the donor account to the recipient account. The registrar, after verifying or confirming the domain name transfer request, may transfer the domain name from the donor account to the recipient account.

18 Claims, 9 Drawing Sheets

US 9,825,907 B2

TRANSFER OF A DOMAIN NAME THROUGH MOBILE DEVICES

CROSS-REFERENCE TO RELATED APPLICATIONS

This application is a divisional of U.S. patent application Ser. No. 14/266,734 entitled "TRANSFER OF A DOMAIN NAME THROUGH MOBILE DEVICES" and filed on Apr. 30, 2014.

FIELD OF THE INVENTION

The present invention generally relates to the field of domain name management and control within a registrar and more specifically to transferring a domain name through the use of mobile devices that are preferably in close proximity.

SUMMARY OF THE INVENTION

The present invention provides methods for transferring a domain name from a donor account to a recipient account in a domain name registering entity, such as a registrar, using a donor mobile device and/or a recipient mobile device, wherein the donor mobile device and recipient mobile device may be, in some embodiments, in close proximity to each other.

In one possible embodiment, a donor account and a recipient account may be created by a registrar. An application may be copied from one or more hardware servers to a donor mobile device and a recipient mobile device. A registrar may receive, from the application on the donor mobile device, a request to transfer a domain name from the donor account to the recipient account. After verifying the request, the registrar may transfer the domain name from the donor account to the recipient account.

In another possible embodiment, the application on the donor mobile device may send a donor request of the domain name to the application on the recipient mobile device and the application on the recipient mobile device may send an acceptance (or rejection) to the application on the donor mobile device. This preferably occurs prior to the domain name registering entity receiving from the application on the donor mobile device the request to transfer the domain name from the donor account to the recipient account. This also preferably occurs with the donor mobile device and the recipient mobile device being in close proximity to each other, i.e., within less than 100 feet of each other.

In another possible embodiment, a domain name registering entity may receive an acceptance to transfer the domain name from the application on the recipient mobile device and only perform the transfer after receiving the acceptance.

In another embodiment, a transfer status may be sent by the domain name registering entity to the application on the donor mobile device and/or the application on the recipient mobile device in realtime during the transfer process. In another embodiment, the domain name registering entity may receive a change to contact information and/or name servers from the application on the recipient mobile device either before or after the domain name has been transferred from the donor account to the recipient account. In another embodiment, the domain name registering entity may receive a change to contact information and/or name servers from the application on the donor mobile device before the domain name has been transferred from the donor account to the recipient account.

In another possible embodiment, an application on a donor mobile device may send a donor request for a domain name to an application on a recipient mobile device. The application on the recipient mobile device may either accept or reject the donor request. If the application on the recipient mobile device (as instructed by the recipient) accepts, the application on the recipient mobile device may send an acceptance of the donor request for the domain name to the application on the donor mobile device. The application on the donor mobile device may send a domain name transfer request for the domain name to a registrar. The registrar, after verifying the request, may transfer the domain name from the donor account to the recipient account.

It should be understood that teachings from any embodiment herein described may be combined with teachings from any other embodiment herein described, unless explicitly stated otherwise. The above features and advantages of the present invention will be better understood from the following detailed description taken in conjunction with the accompanying drawings.

DETAILED DESCRIPTION

Figure 1:
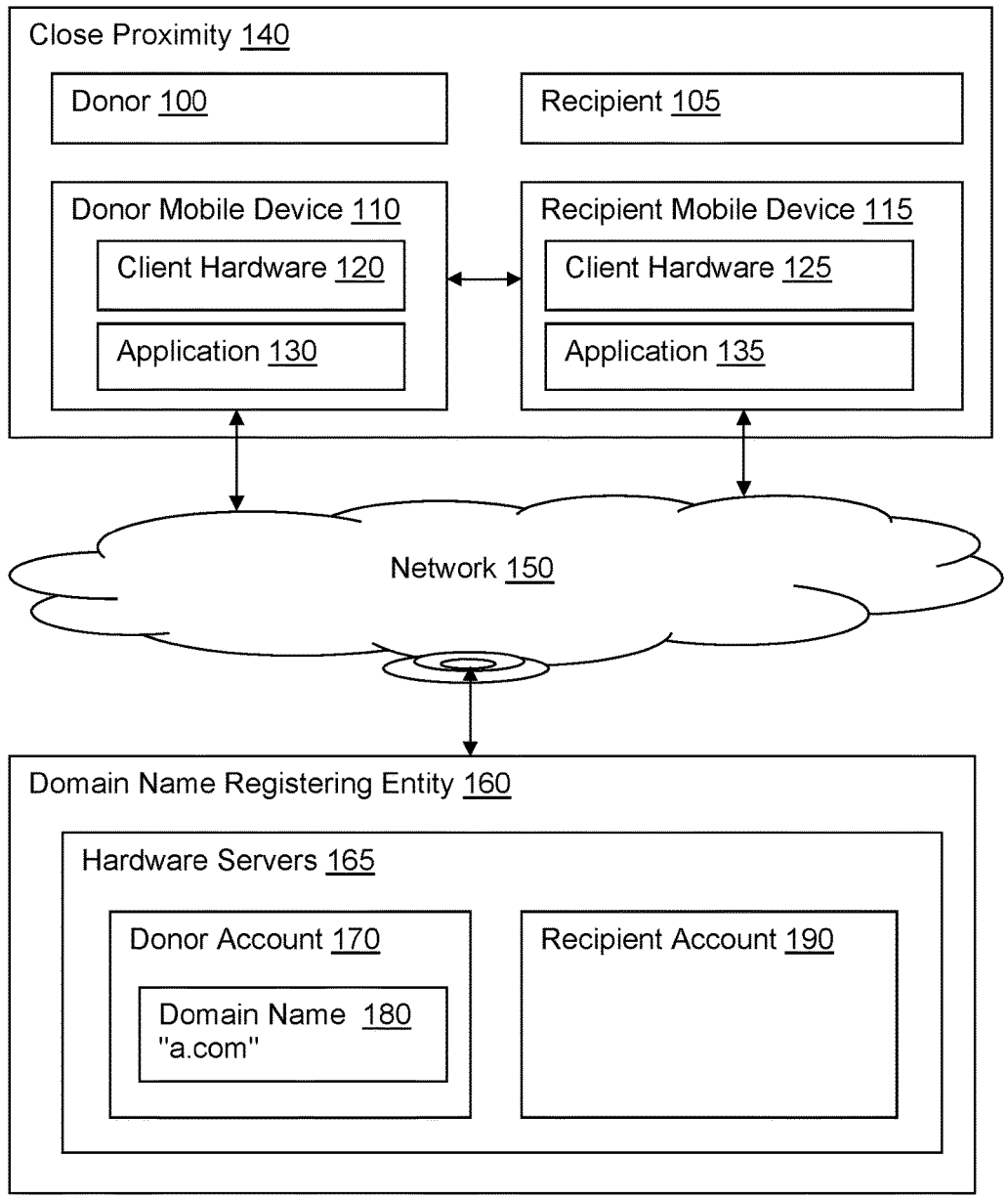
FIG. 1 is a block diagram of a system for transferring a domain name through mobile devices in close proximity at the start of the process, i.e., the domain name is still in the donor account.

The present invention will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

FIG. 1 is a block diagram of a system for transferring a domain name, such as, as a non-limiting example, a.com 180, using an application on a donor mobile device 110 and an application on a recipient mobile device 115, preferably in close proximity 140. As illustrated, at the start of the process the domain name a.com 180 may start in a donor account 170.

A network 150 may be a collection of links and nodes (e.g., multiple computers and/or other devices connected together) arranged so that information may be passed from one part of the network 150 to another over multiple links and through various nodes. Examples of networks 150 include the Internet, the public switched telephone network, the global Telex network, cell phone networks, computer networks (e.g., an intranet, an extranet, a local-area network, or a wide-area network), wired networks and/or wireless networks. The network 150 may comprise one or more of the listed examples of networks 150.

The Internet is a specific example of a network 150 and is a worldwide network of computers and computer networks arranged to allow for the easy and robust exchange of information between Internet users and website resources stored on hosting servers. Hundreds of millions of people around the world have access to computers (including mobile devices 110, 115) connected to the Internet via Internet Service Providers (ISPs).

Content providers place website resources, such as, as non-limiting examples, multimedia information (e.g., text, graphics, audio, video, animation, and other forms of data) at specific locations on the Internet which may be operated from hosting servers. The combination of all the websites, website resources and their corresponding web pages on the Internet are generally known as the World Wide Web (WWW) or simply the Web.

For Internet users and businesses alike, the Internet continues to be increasingly valuable. More people use the Web for everyday tasks, from social networking, shopping, banking, and paying bills to consuming media and entertainment. E-commerce is growing, with businesses delivering more services and content across the Internet, communicating and collaborating online, and inventing new ways to connect with each other. Internet users may use, as non-limiting examples, a cell phone, PDA, tablet, laptop computer or desktop computer to access websites or servers.

While Internet users in general may use a wide variety of devices to access the Internet, the present invention is directed towards a system where either or both of a donor 100 (of a domain name) and a recipient 105 (of the domain name) use a mobile device. In preferred embodiments, the donor 100 may use an application on a donor mobile device 110 and/or the recipient 105 may use an application on a recipient mobile device 115. In these preferred embodiments, either or both of the mobile devices 110, 115 may include client hardware 120, 125 that comprises a cell phone, PDA, tablet or laptop computer, i.e., a mobile device.

Prevalent on the Web are multimedia websites, some of which may offer and sell goods and services to individuals and organizations. Websites may consist of a single webpage, but typically consist of multiple interconnected and related webpages. Websites, unless very large and complex or have unusual traffic demands, typically reside on a single hosting server and are prepared and maintained by a single individual or entity (although websites residing on multiple hosting servers are certainly possible). Menus, links, tabs, etc. may be used by Internet users to move between different web pages within the website or to move to a different website, possibly on the same or a different hosting server.

Websites may be created using HyperText Markup Language (HTML) to generate a standard set of tags that define how the webpages for the website are to be displayed. Internet users may access content providers' websites using software known as an Internet browser, such as MICROSOFT INTERNET EXPLORER, GOOGLE CHROME or MOZILLA FIREFOX. After the browser has located the desired webpage, the browser requests and receives information from the webpage, typically in the form of an HTML document, and then displays the webpage content for the Internet user. The Internet user then may view other webpages at the same website or move to an entirely different website using the browser.

Some website operators, typically those that are larger and more sophisticated, may provide their own hardware, software, and connections to the Internet. But many website operators either do not have the resources available or do not want to create and maintain the infrastructure necessary to host their own websites. To assist such individuals (or entities), hosting companies exist that offer website hosting services. These hosting providers typically provide the hardware, software, and electronic communication means necessary to connect multiple websites to the Internet. A single hosting provider may literally host thousands of websites on one or more hosting servers.

The server or hosting server comprise hardware servers and may be, as non-limiting examples, one or more Dell PowerEdge(s) rack server(s), HP Blade Servers, IBM Rack or Tower servers, although other types of servers and combinations of one or more servers may be used. Various software packages and applications may run on the servers as desired.

Browsers are able to locate specific websites because each website, resource, and computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

IP addresses, however, even in human readable notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name. An example of a URL with a HTTP request and domain name is: http://www.companyname.com. In this example, the "http" identifies the URL as a HTTP request and the "companyname.com" is the domain name.

Domain names are much easier to remember and use than their corresponding IP addresses. The Internet Corporation for Assigned Names and Numbers (ICANN) approves some Generic Top-Level Domains (gTLD) and delegates the responsibility to a particular organization (a "registry") for maintaining an authoritative source for the registered domain names within a Top-Level Domain (TLD) and their corresponding IP addresses. For certain TLDs (e.g., .biz, .info, .name and .org) the Registry is also the authoritative source for contact information related to the domain name and is referred to as a "thick" Registry. For other TLDs (e.g., .com and .net) only the domain name, registrar identification, and name server information is stored within the Registry, and a Registrar is the authoritative source for the contact information related to the domain name. Such Registries are referred to as "thin" registries. Most gTLDs are organized through a central domain name Shared Registration System (SRS) based on their TLD. TLDs may also be referred to as domain name extensions.

The process for registering a domain name with .com, .net, .org, and some other TLD allows a website operator (such as the donor 100 or the recipient 105 in FIG. 1) to use an ICANN-accredited Registrar to register their domain name. For example, if a website operator, John Doe, wishes to register the domain name "mycompany.com," John Doe may initially determine whether the desired domain name is available by contacting a domain name registrar. The website operator may make this contact using the Registrar's webpage and typing the desired domain name into a field on the registrar's webpage created for this purpose. Upon receiving the request from the website operator, the Registrar may ascertain whether "mycompany.com" has already been registered by checking the SRS database associated with the TLD of the domain name and/or by checking with the Registry. The results of the search then may be displayed on the webpage to thereby notify the website operator of the availability of the domain name. If the domain name is available, the website operator may proceed with the registration process. If the domain name is not available for registration, the website operator may keep selecting alternative domain names until an available domain name is found.

Figure 2:
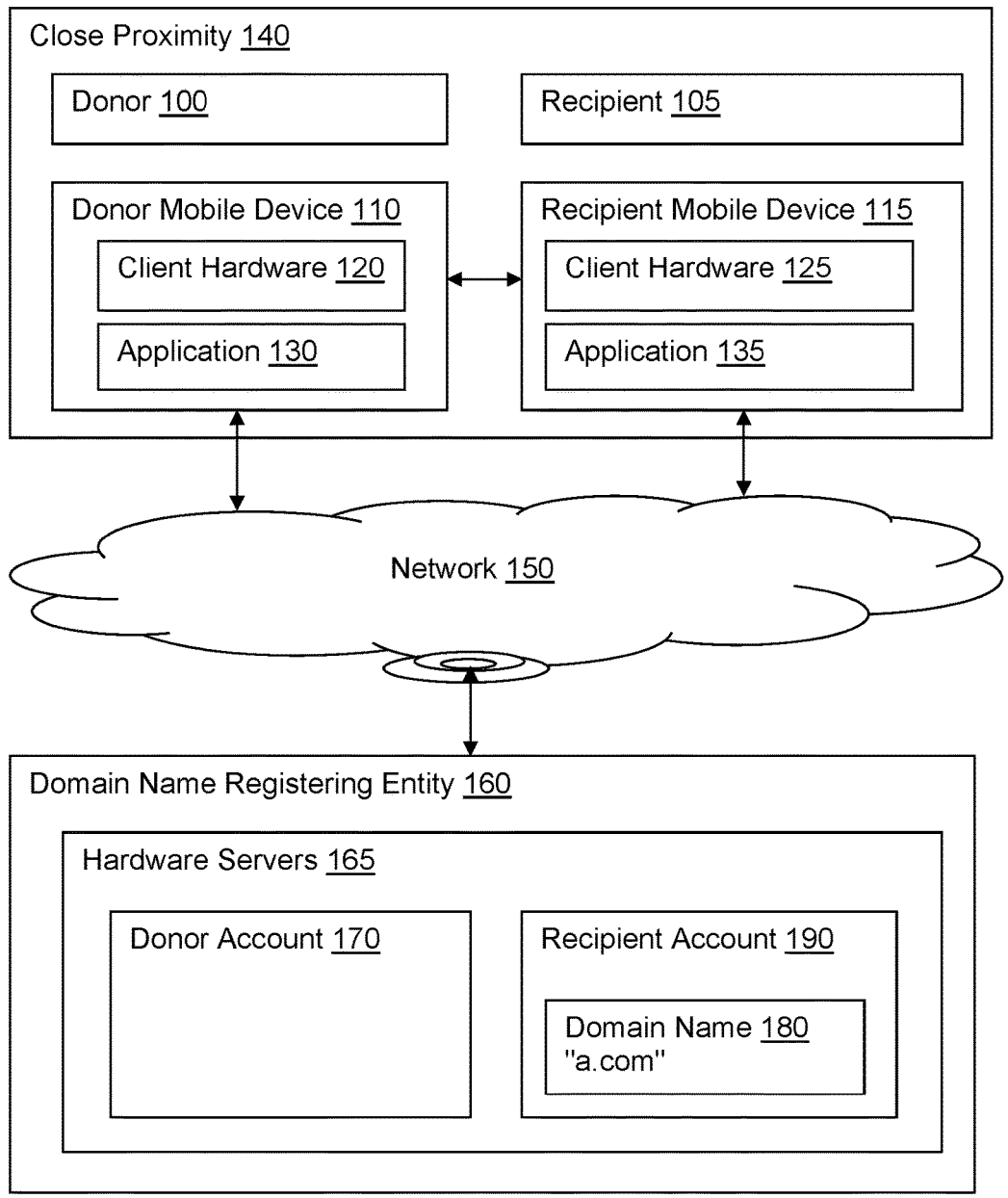
FIG. 2 is a block diagram of a system for transferring a domain name through mobile devices in close proximity at the end of the process, i.e., the domain name has been transferred to the recipient account.

A domain name registering entity 160 may be any entity that is capable of registering a domain name to a registrant. As non-limiting examples, a domain name registering entity 160 may be a registrar or a reseller for a registrar. The domain name registering entity 160 may include a plurality of customer accounts 170, 190. While only two customer accounts, a donor account 170 and a recipient account 190, are shown in FIGS. 1 and 2, any number of customer accounts 170, 190 may exist. Each customer account 170, 190 may be accessed, typically through a login or verification process, by a customer to manage and control one or more domain names and possibly other services purchased by and under control by the customer. As an example, in FIGS. 1 and 2, the donor 100 has created and has control over donor account 170 and recipient 105 has created and has control over recipient account 190. The accounts 170, 190 may be created by the domain name registering entity 160 using hardware servers 165 and software after receiving identification information and account information provided by the customers, i.e., donor 100 and recipient 105 respectively. (Step 300)

Sometimes a registrant (donor 100) of a domain name (a.com 180) may want to transfer the domain name (a.com 180) to somebody else as a gift, after selling the domain name to another person (recipient 105) or for the recipient 105 to take over, manage and control the domain name (a.com 180) from the recipient account 190. As an example, in FIG. 1, the donor 100 may want to transfer the domain name a.com 180 in the donor account 170 to the recipient account 190. While this may be accomplished using non-mobile devices, it may be desirable to allow two parties 100, 105 to transfer a domain name using either an application on a donor mobile device 110 or an application on a recipient mobile device 115 or an application on two mobile devices 110, 115. Using mobile devices 110, 115 has the advantage of allowing the donor 100 and recipient 105 to initiate and complete the transfer of a domain name 180 from anywhere in the world. However, in preferred embodiments, the donor mobile device 110 and the recipient mobile device 115 are in close proximity 140 to each other.

To assist in coordinating the transfer of the domain name 180 from the donor account 170 to the recipient account 190, one or more hardware servers 165 may copy an application 130, 135, i.e., software program, to the donor mobile device 110 and/or the recipient mobile device 115. The application 130, 135 may permit mobile devices 110, 115 with the application 130, 135 to communicate with each other, particularly when in close proximity 140. In preferred embodiments, any protocol that enables short range communication between mobile devices 110, 115 may be used by the applications 130, 135 to facilitate the communication. As non-limiting examples, communication protocols Airdrop and Bluetooth may be used for iOS and NFC and Bluetooth may be used for Android by the mobile devices 110, 115 to communicate with each other.

In a possible embodiment, the application 130, 135 may allow the donor 100, the individual possibly gifting a registered domain name 180, to a recipient 105 to initiate a domain name transfer process. The recipient 105, the individual receiving the domain name 180, may initiate an accept transfer action. The application 130 on the donor mobile device 110 may attempt to initiate a transfer using protocols available on the donor mobile device 110. The application 130 on the recipient mobile device 115 may listen for the transfer-initiation communication on protocols available on the recipient mobile device 115. If a common communication protocol cannot be found, or if the donor 100 and/or recipient 105 choose to do so, the application 130 may fall back to display/capture information through QR codes or transfer of domain names 180 between accounts using a single device. Multiple mobile devices 110, 115 used in the transfer process need not run the same operating system as long as they both can run versions of the application 130, 135. In "two device mode," the donor 100 may elect to edit contact and/or name server information before initiating the transfer. Once communication is established, the application on the recipient mobile device 115 may be prompted to log into the recipient account 190 or create a recipient account 190 if one has not already been created. Once the recipient account 190 is verified, the recipient 190 may confirm the transfer and elect to edit contact and/or name server information. Transfer status may then be relayed in realtime to the donor mobile device 110 and the recipient mobile device 115, or in the event of a delay, the application 130, 135 displays status of past and present transfers and alerts the donor 100 and recipient 105 when a transfer is complete. In "single mode," a wizard interface may be used to allow a user to log into the donor account, enter all necessary information, then log into the recipient account to initiate and complete the transfer of the domain name 180 from the donor account 170 to the recipient account 190.

The donor mobile device 110 and recipient mobile device 115 may contact the one or more hardware servers 165 and request the application 130, 135 be loaded on the donor mobile device 110 and the recipient mobile device 115 using any method now known or developed in the future. (Step 301) As a non-limiting example, the File Transfer Protocol (FTP) may be used to send a copy of the application 130, 135 to the mobile devices 110, 115.

The application on the donor mobile device 110 may send, and the domain name registering entity 160 may receive, a request to transfer a domain name 180, such as a.com, from the donor account 170 to a recipient account 190. (Step 302) In some embodiments, the application 130 will only permit the donor mobile device 110 to send the request to transfer the domain name if the application on the donor mobile device 110 received an acceptance from the recipient mobile device 115 for the transfer.

The domain name registering entity 160 may transfer the domain name 180 from the donor account 170 to the recipient account 190. (Step 303) The transfer thus allows the recipient to have full control over the management of the domain name 190. In some embodiments, the domain name registering entity 160 will verify the application on the recipient mobile device 115 has accepted the transfer before initiating or performing the transfer of the domain name 180 from the donor account 170 to the recipient account 190.

Figure 3:
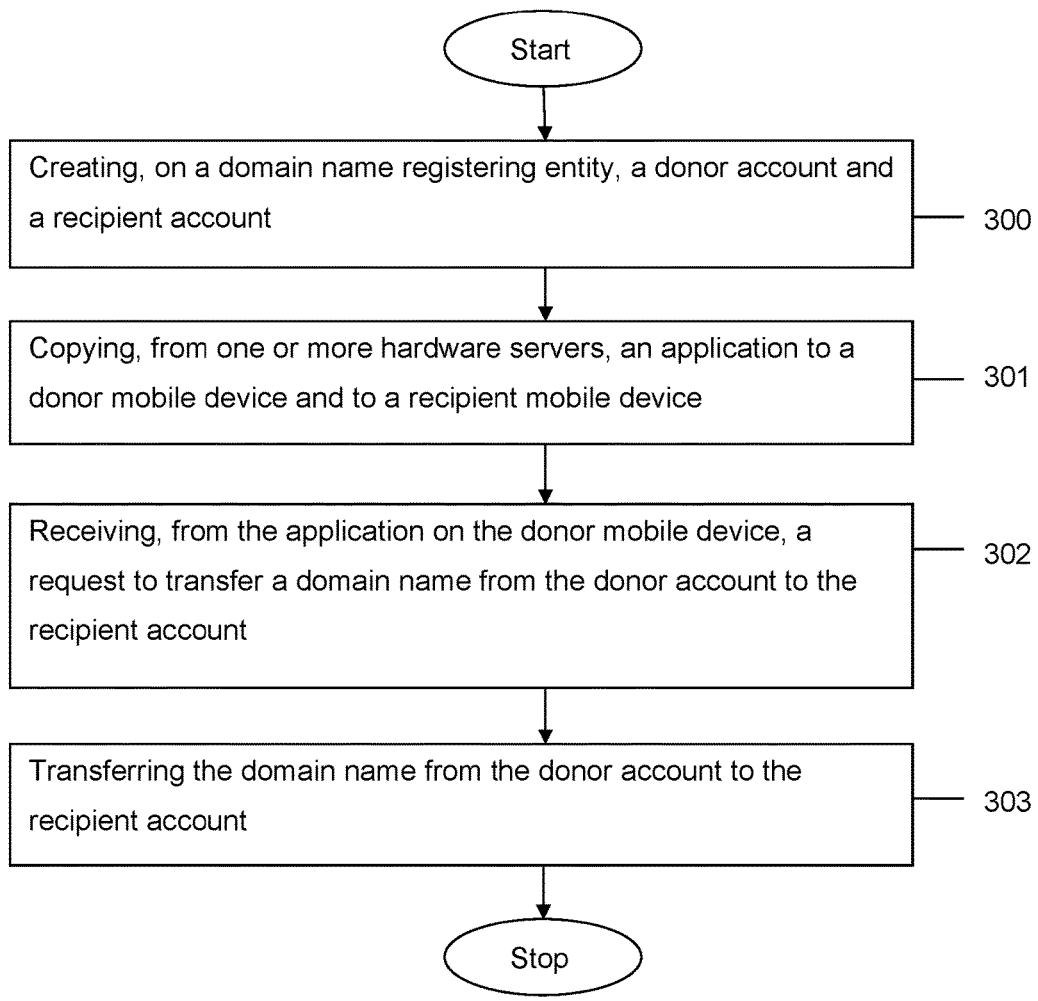
FIGS. 3-9 are flow diagrams of various process embodiments for transferring a domain name from a donor account to a recipient account within a domain name registering entity through the use of mobile devices, wherein the mobile devices are preferably in close proximity to each other.
Figure 4:
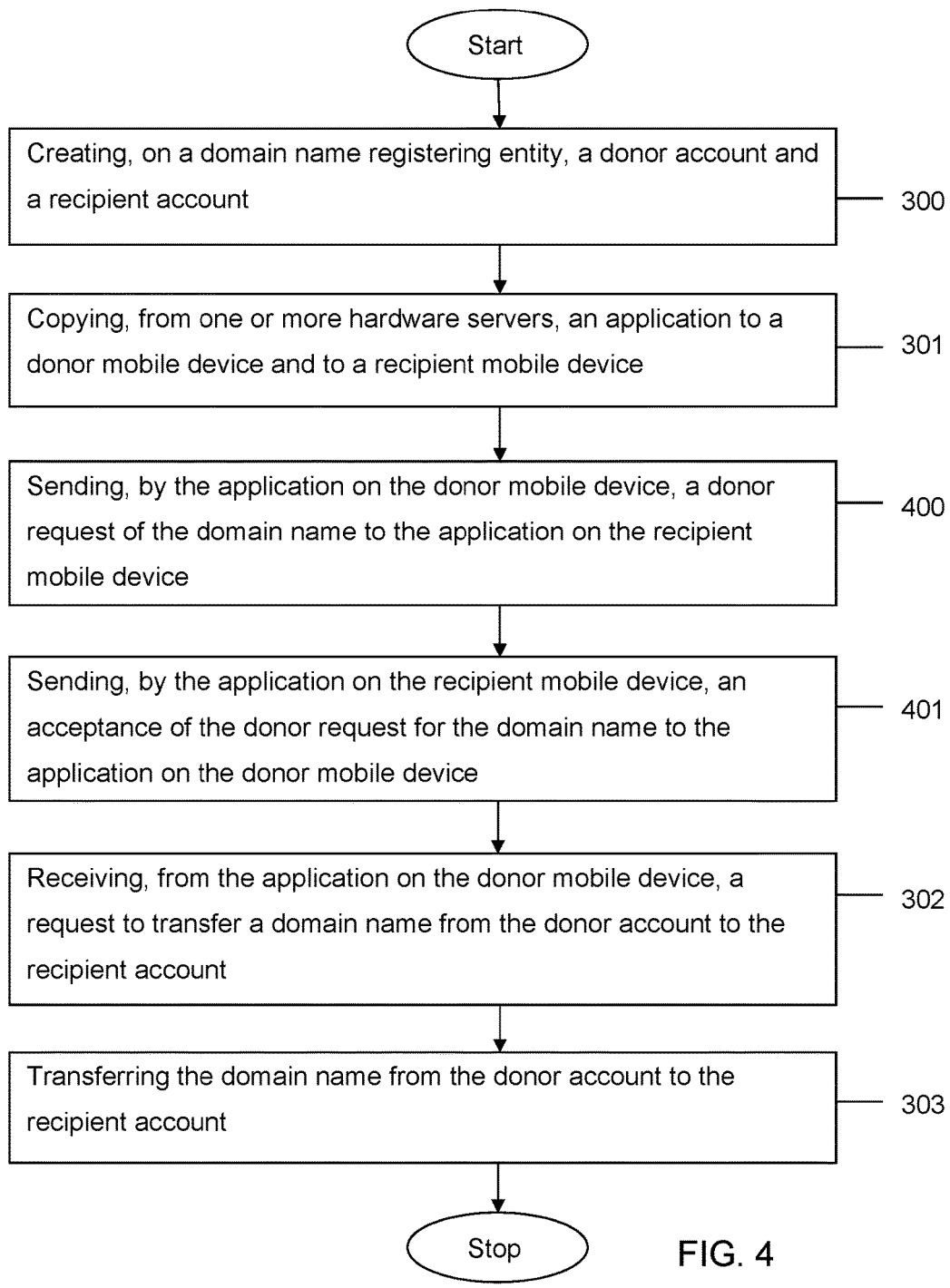

FIG. 4 illustrates another embodiment of the invention. This embodiment is similar to that discussed with regard to FIG. 3, except prior to receiving from the application on the donor mobile device the request to transfer the domain name 180 from the donor account 170 to the recipient account 190 additional steps may be taken. Specifically, the application on the donor mobile device 110 may send a request to the application on the recipient mobile device 115 to transfer the domain name 180. (Step 400) The application on the recipient mobile device 115 may send an acceptance of the donor request for the domain name 180 to the application on the donor mobile device 110. (Step 401) In preferred embodiments, the donor mobile device 110 is in close proximity 140 to the recipient mobile device 115. The mobile devices 110, 115 may be required to be touching, have touched or bumped, be within 10 feet or be within 100 feet of each other during steps 400 and 401. In other embodiments, the mobile devices 110, 155 may be widely separated from each other during the entire process.

In a possible embodiment, the request to transfer the domain name 180 may include data comprising a security code that confirms that the recipient 105 on the recipient mobile device 115 has already agreed to and/or accepted the transfer.

Figure 5:
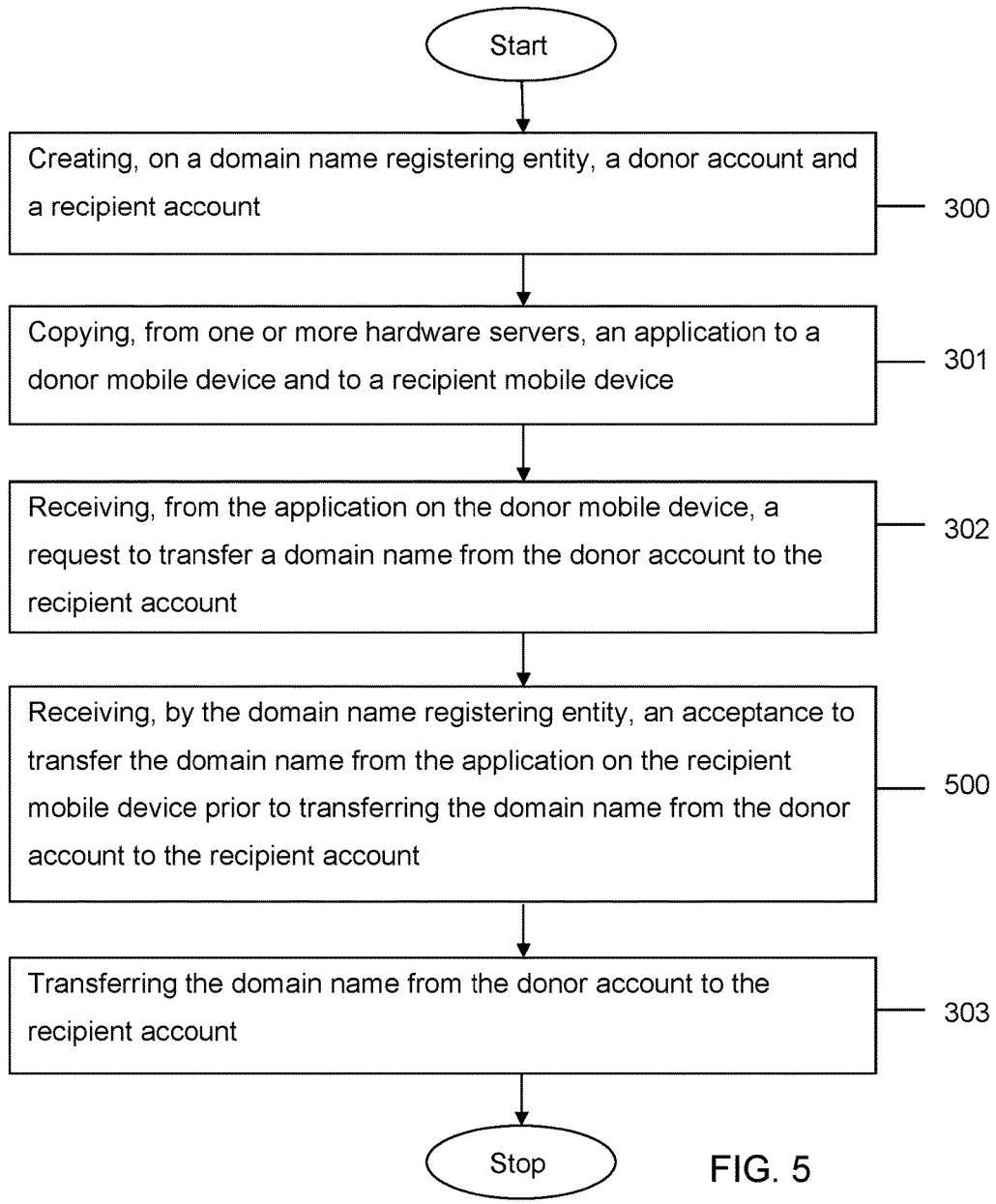

FIG. 5 illustrates another possible embodiment. This embodiment is similar to that discussed with regard to FIG. 3, but also includes the step of the application on the recipient mobile device 115 sending, and the domain name registering entity 160 receiving, an acceptance to the transfer of the domain name 180 prior to transferring the domain name 180 from the donor account 170 to the recipient account 190. (Step 500)

Figure 6:
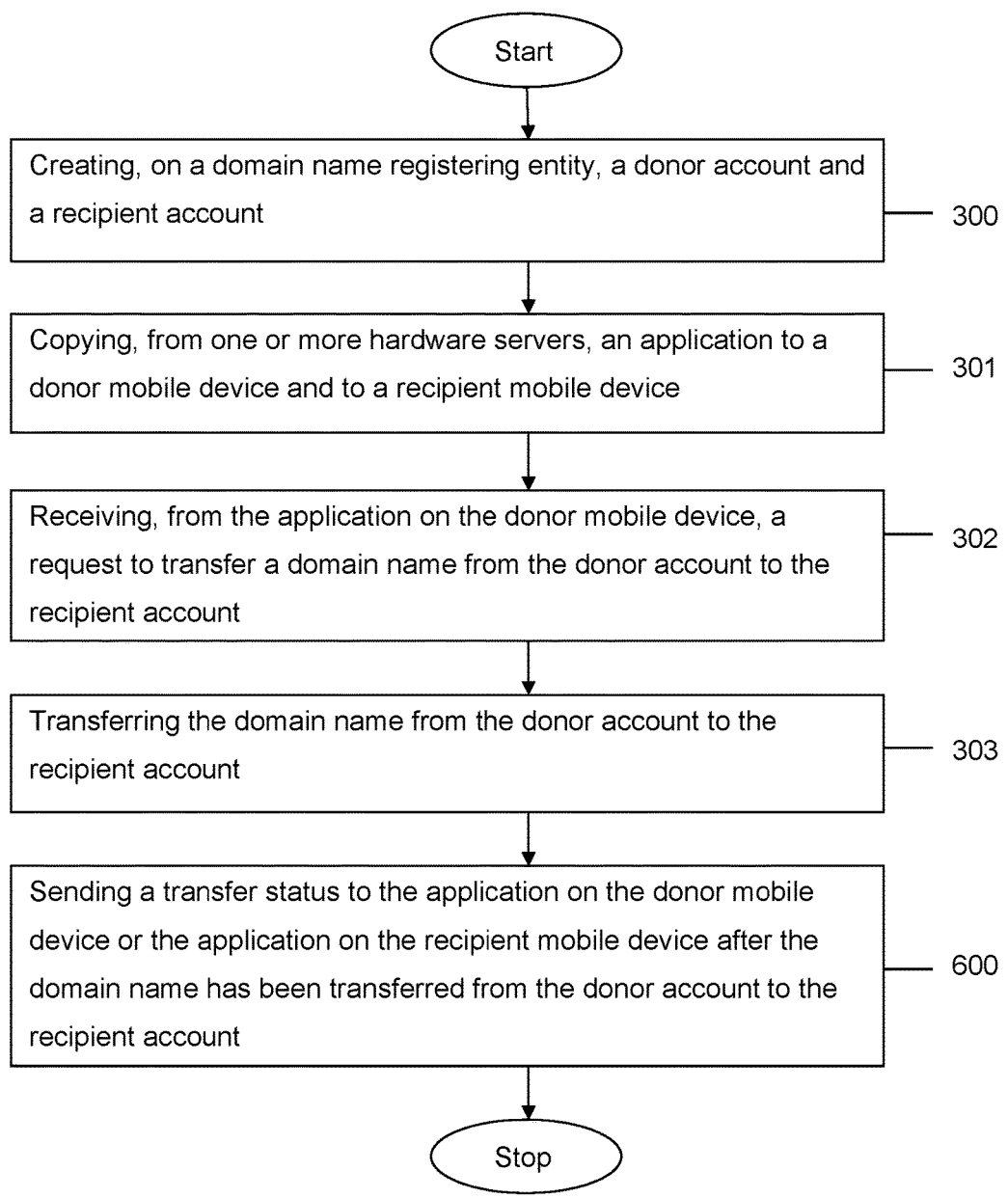

FIG. 6 illustrates another possible embodiment. This embodiment is similar to that discussed with regard to FIG. 3, but also includes the step of sending a transfer status to the application on the donor mobile device 110 and/or the application on the recipient mobile device 115 after the domain name 180 has been transferred from the donor account 170 to the recipient account 190 as illustrated in FIG. 2. (Step 600)

Figure 7:
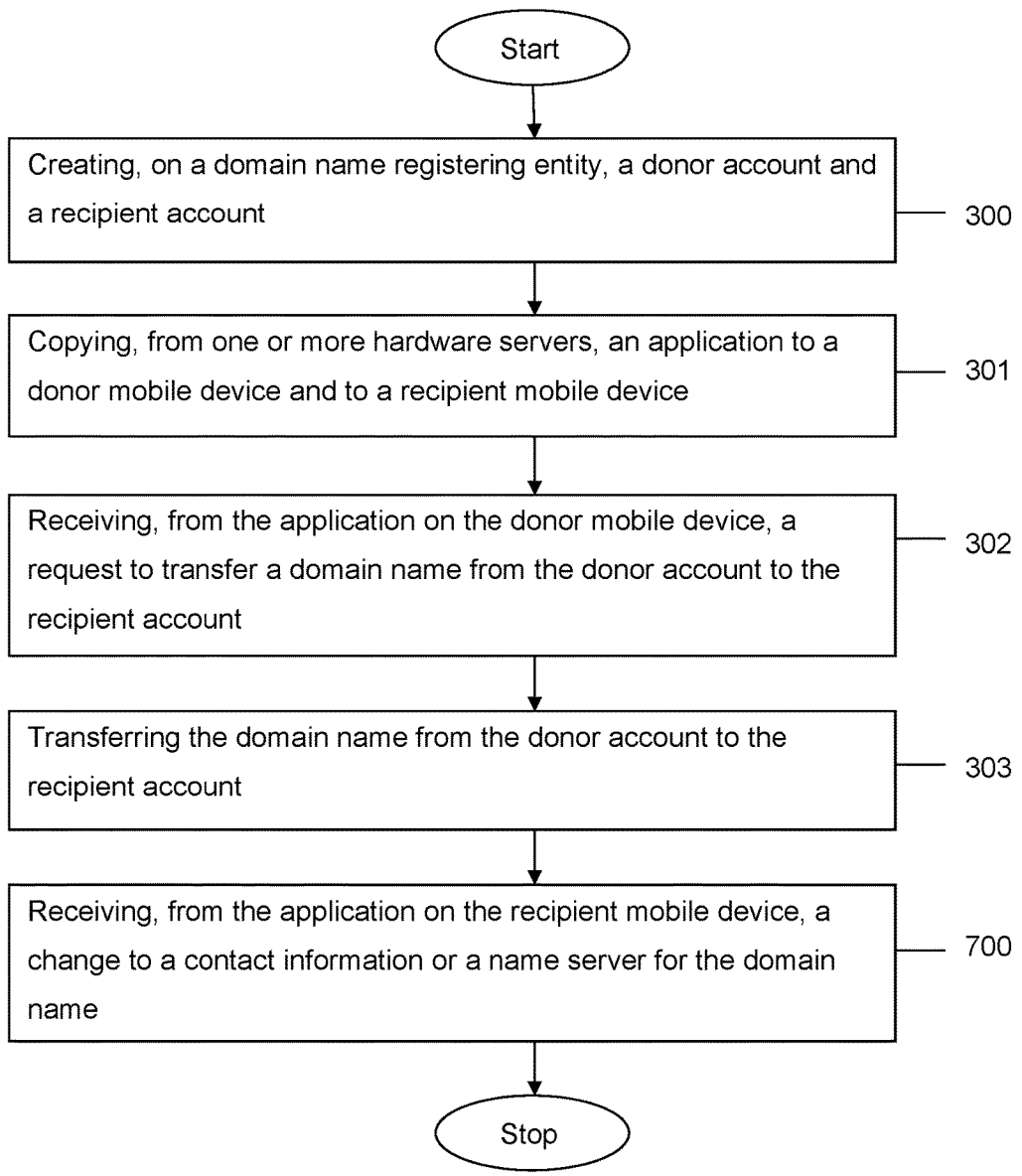

FIG. 7 illustrates another possible embodiment. This embodiment is similar to that discussed with regard to FIG. 3, but also includes the step of receiving, from the application on the recipient mobile device 115, a change to a contact information and/or a name server for the domain name. (Step 700) The recipient 105 may change the contact information and/or name server on the application on the recipient mobile device 115 either before or after the transfer of the domain name 180 from the donor account 170 to the recipient account 190.

Figure 8:
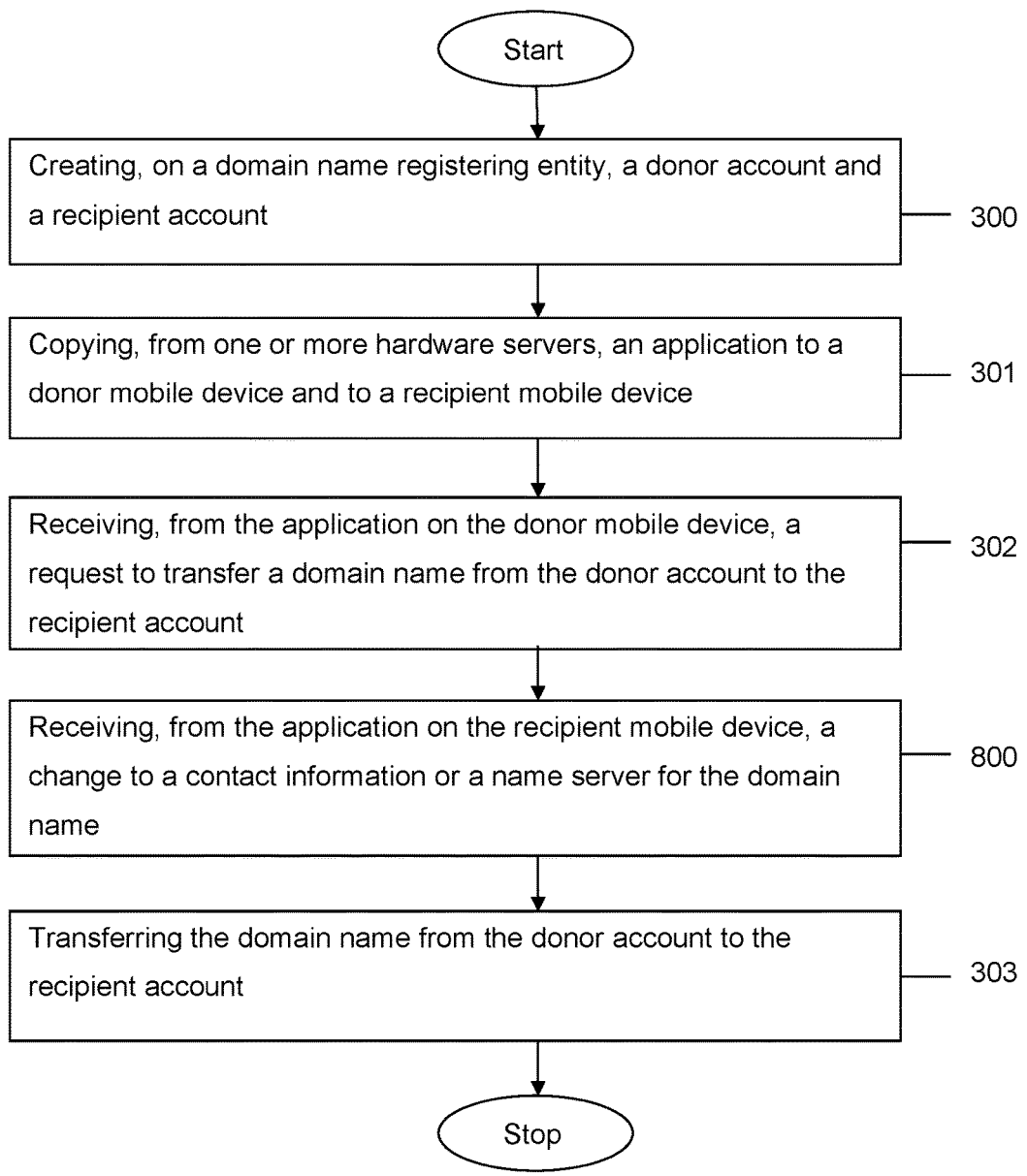

FIG. 8 illustrates another possible embodiment. This embodiment is similar to that discussed with regard to FIG. 3, but also includes the step of receiving, from the application on the donor mobile device 110, a change to a contact information and/or a name server for the domain name 180 prior to transferring the domain name 180 from the donor account 170 to the recipient account 190.

Figure 9:
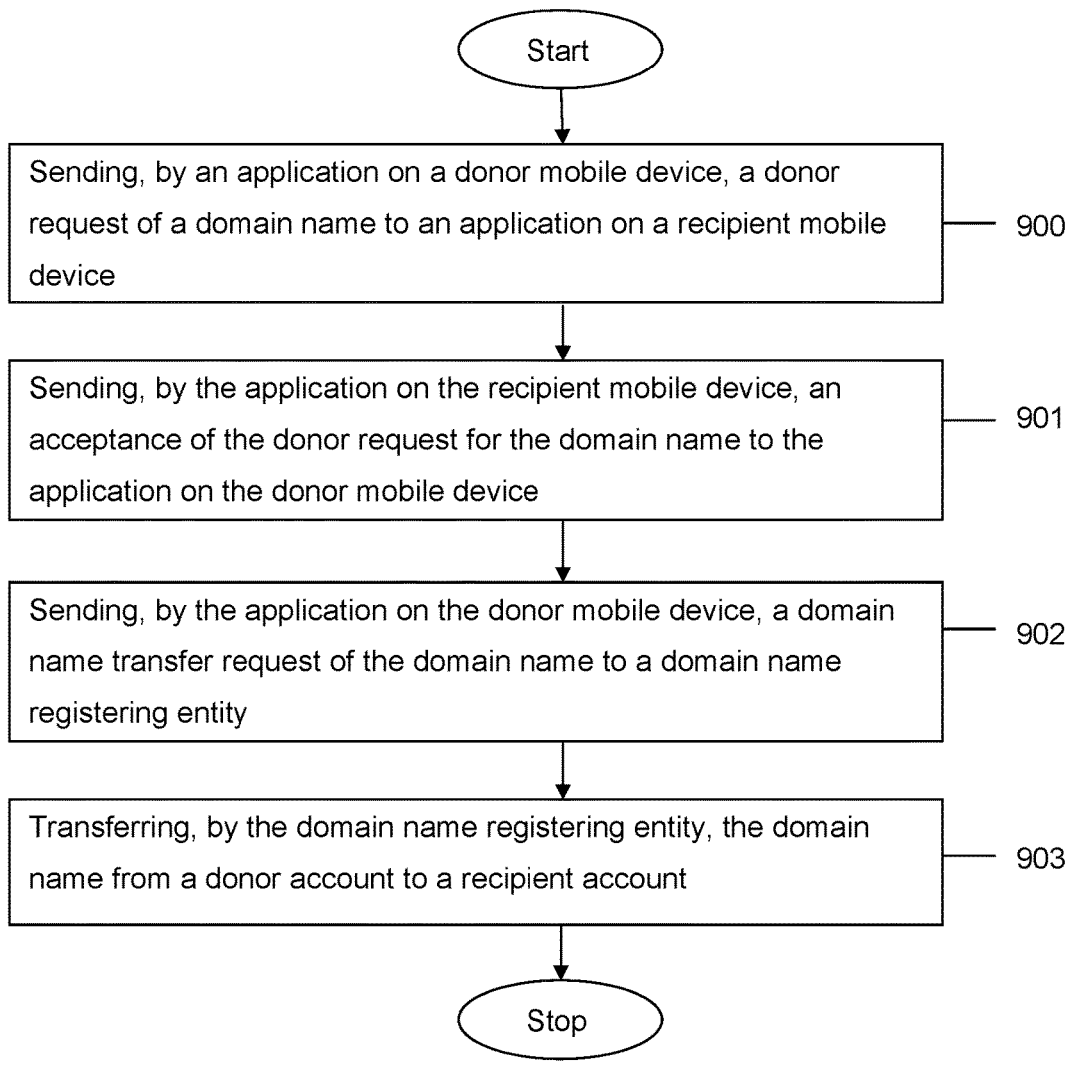

FIG. 9 illustrates another possible embodiment. In this embodiment an application on a donor mobile device 110 may send a donor request of a domain name 180 to an application on the recipient mobile device 115. (Step 900) The application on the recipient mobile device 115 may send an acceptance of the donor request for the domain name 180 to the application on the donor mobile device 110. (Step 901) The application on the donor mobile device 110 may send a domain name transfer request of the domain name 180 to a domain name registering entity 160. (Step 902) The domain name registering entity 160 may transfer the domain name 180 from a donor account 170 to a recipient account 190 within the domain name registering entity 160. (Step 903)

In another possible embodiment, the donor mobile device 110 may initiate a request to move a domain name 180 from a donor account 170 to a recipient account 190. The request may be sent to both the recipient mobile device 115 and the domain name registering entity 160. The request would then be 'on hold' until the recipient 105 accepted or rejected the request on the recipient mobile device 115. The recipient mobile device 115 may then communicate to both the donor mobile device 110 and the domain name registering entity 160 the acceptance or rejection of the domain name transfer request. If the transfer request is accepted by the recipient mobile device 115, the domain name registering entity 160 may transfer the domain name from the donor account 170 to the recipient account 190.

It should be understood that teachings from any embodiment herein described may be combined with teachings from any other embodiment herein described, unless explicitly stated otherwise.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A method, comprising the steps of:
   sending, by an application on a donor mobile device, a donor request of a domain name to an application on a recipient mobile device;
   receiving, by the application on the donor mobile device, an acceptance to the donor request of the domain name from the application on the recipient mobile device; and
   sending, by the application on the donor mobile device, a domain name move request to one or more hardware servers, only if the acceptance was received from the application on the recipient mobile device.

2. The method of claim 1, further comprising the step of:
   triggering, by the application on the donor mobile device sending the domain name move request, the one or more hardware servers to move the domain name from a donor account to a recipient account.

3. The method of claim 2, further comprising the step of:
   receiving, by the application on the donor mobile device, a move status after the domain name has been moved from the donor account to the recipient account.

4. The method of claim 2, further comprising the step of:
   sending, by the application on the donor mobile device, a change to a contact information or a name server for the domain name prior to transferring the domain name from the donor account to the recipient account.

5. The method of claim 1, wherein a domain name registering entity comprises the one or more hardware servers.

6. The method of claim 1, wherein the donor mobile device and the recipient mobile device are within 100 feet of each other.

7. A method, comprising the steps of:
receiving, by an application on a recipient mobile device, a donor request of a domain name from an application on a donor mobile device;
sending, by the application on the recipient mobile device, a first acceptance to the donor request of the domain name to the application on the donor mobile device; and
triggering, by the application on the recipient mobile device, only if the first acceptance to the donor request was sent by the application on the recipient mobile device:
the application on the donor mobile device to send a domain name move request to one or more hardware servers; and
the one or more hardware servers to move the domain name from a donor account to a recipient account.

8. The method of claim 7, wherein a domain name registering entity comprises the one or more hardware servers.

9. The method of claim 7, wherein the donor mobile device and the recipient mobile device are within 100 feet of each other.

10. The method of claim 7, further comprising the step of:
receiving, by the application on the recipient mobile device, a move status after the domain name has been moved from the donor account to the recipient account.

11. The method of claim 7, further comprising the step of:
sending, by the application on the recipient mobile device, to the one or more hardware servers, a second acceptance to transfer the domain name prior to transferring the domain name from the donor account to the recipient account.

12. The method of claim 7, further comprising the step of:
sending, by the application on the recipient mobile device, a change to a contact information or a name server for the domain name to the one or more hardware servers.

13. A mobile device, comprising:
a processor executing an application on the mobile device to perform the steps of:
sending, by the application on the mobile device, a donor request of a domain name to an application on a recipient mobile device;
receiving, by the application on the mobile device, an acceptance to the donor request of the domain name from the application on the recipient mobile device; and
sending, by the application on the mobile device, a domain name move request to one or more hardware servers, only if the acceptance was received from the application on the recipient mobile device.

14. The mobile device of claim 13, wherein the processor is configured to perform the step of triggering, by the application on the mobile device sending the domain name move request, the one or more hardware servers to move the domain name from a donor account to a recipient account.

15. The mobile device of claim 14, wherein the processor is configured to perform the step of receiving, by the application on the mobile device, a move status after the domain name has been moved from the donor account to the recipient account.

16. The mobile device of claim 14, wherein the processor is configured to perform the step of sending, by the application on the mobile device, a change to a contact information or a name server for the domain name prior to transferring the domain name from the donor account to the recipient account.

17. The mobile device of claim 13, wherein a domain name registering entity comprises the one or more hardware servers.

18. The mobile device of claim 13, wherein the mobile device and the recipient mobile device are within 100 feet of each other.

* * * * *